United States Patent
Rizk et al.

(10) Patent No.: US 12,463,410 B2
(45) Date of Patent: Nov. 4, 2025

(54) POWER TRANSMISSION TOWER STRUCTURE WITH EMBEDDED GROUND CONDUCTOR FOR IMPROVING LIGHTNING PERFORMANCE AND METHOD FOR DETERMINING LOCATION AND EFFECT OF EMBEDDED CONDUCTOR

(71) Applicants: Farouk A. M. Rizk, Saint-Lambert (CA); Amr Rizk, Verdun (CA)

(72) Inventors: Farouk A. M. Rizk, Saint-Lambert (CA); Amr Rizk, Verdun (CA)

(*) Notice: Subject to any disclaimer, the term of this patent is extended or adjusted under 35 U.S.C. 154(b) by 220 days.

(21) Appl. No.: 18/255,792

(22) PCT Filed: Dec. 6, 2021

(86) PCT No.: PCT/CA2021/051737
§ 371 (c)(1),
(2) Date: Jun. 2, 2023

(87) PCT Pub. No.: WO2022/115968
PCT Pub. Date: Jun. 9, 2022

(65) Prior Publication Data
US 2024/0106220 A1   Mar. 28, 2024

Related U.S. Application Data

(60) Provisional application No. 63/121,497, filed on Dec. 4, 2020.

(51) Int. Cl.
*H02G 13/00* (2006.01)
*H02G 1/02* (2006.01)
*H02G 7/22* (2006.01)

(52) U.S. Cl.
CPC ............. *H02G 13/40* (2013.01); *H02G 1/02* (2013.01); *H02G 7/22* (2013.01)

(58) Field of Classification Search
CPC ............. H02G 13/40; H02G 1/02; H02G 7/22
See application file for complete search history.

(56) References Cited

U.S. PATENT DOCUMENTS

| | | | |
|---|---|---|---|
| 8,163,993 B2* | 4/2012 | Gordin | H01R 4/66 439/98 |
| 2010/0236808 A1 | 9/2010 | Rizk et al. | |
| 2018/0019526 A1* | 1/2018 | Stilwell | H01R 4/023 |

FOREIGN PATENT DOCUMENTS

| CN | 104538921 | 4/2015 |
|---|---|---|

OTHER PUBLICATIONS

CN 205160010 U ; English Translation (Year: 2016).*

(Continued)

*Primary Examiner* — Pete T Lee
(74) *Attorney, Agent, or Firm* — Gonzalo Lavin; Lavery, de Billy, L.L.P.

(57) ABSTRACT

Power line conductors are normally shielded from direct lightning strikes by appropriately placed overhead ground wires. However, even when such overhead ground wires work as intended and intercept a strike, for a short period of time, typically a few microseconds, the shield wire is exposed to an impulse type potential rise. This could be sufficient to cause flashover of one or more line insulator strings. This is called backflash. The present invention solves this problem by providing a power transmission tower structure with an embedded ground conductor positioned in order to optimize the coupling factors to all conductors and reduce stress on all insulator strings through increased electromagnetic coupling. Use of a streamer-inhibited conductor avoids adverse effects such as radio interference and audible noise due to induced charges and improves electromagnetic coupling as a result of the reduced surge impedance of the conductor.

13 Claims, 11 Drawing Sheets

(56) References Cited

OTHER PUBLICATIONS

CN 205160010U English Translation publication on Apr. 13, 2016 (Year: 2016).*

KR 20180001315 U; English Translation published on May 8, 2018 (Year: 2018).*

F.A.M. Rizk, "Modeling of transmission line exposure to direct lightning strikes", IEEE Transactions on Power Delivery, vol. 5, Issue 4, Nov. 1990, pp. 1983-1997.

F.A.M. Rizk, "Modeling of proximity effect on positive leader inception and breakdown of long air gaps", IEEE Transactions on Power Delivery, vol. 24, Issue4, Apr. 2011, pp. 2311-2318.

F.A.M. Rizk, " Modeling of UHV and double circuit EHV transmission line exposure to direct lightning strikes", IEEE Transactions on Power Deliver, vol. 32, Issue4, Aug. 2017, pp. 1739-1747.

F.A.M. Rizk, "A simplified approach for assessment of exposure of EHV and UHV lines to direct lightning strikes", IEEE Transactions on Power Delivery, vol. 33, Issue 5, Oct. 2018, pp. 2420-2427.

A.R. Hileman, Insulation Coordination for Power Systems, Book, Marcel Dekker Inc., New York, 1999, Chapter 10, The Backflash, p. 402.

S. Visacro F.H. Silveira and A. De Conti, " The use of Underbuilt Wires to Improve the Lightning Performance of Transmission Lines", IEEE Transactions on Power Delivery, vol. 27, No. 1, Jan. 2012, pp. 205-2013.

F.A.M. Rizk, "New Approach for Assessment of Positive Streamer Penetration of Long Air gaps under Impulse Voltages", IEEE Transactions on Dielectrics and Electrical Insulation, vol. 27, issue 3, Jun. 2020, pp. 791-798.

L.I. Sirotinski, "Hochspannungstechnik", Book, vol. 1, Part 1, Chapter 5, 1955, p. 132.

Les Renardieres Group, "Negative Discharges in Long Air Gaps at Les Renardieres", Electra, No. 74, Jan. 1981, p. 112.

C. Gary, G. Dragan, D. Critescu,"Attenuation of Travelling Waves Caused by Corona", CIGRE, Paper 33-13, 1978.

J.G. Anderson, "Lightning Performance of Transmission Lines", Book, Chapter 12, Transmission Line Reference Book, 345 kV and Above, Second Edition, 1987, pp. 545-597.

CIGRE WG 33.01, "Guide to Procedures for Estimating the Lightning Performance of Transmission Lines", TB 63, Oct. 1991.

IEC Standard 60-1, "High Voltage Test Techniques", Part 1: "General definitions and test requirements", 1989.

IEC Standard 71-2, "Insulation Coordination—Part2: Application Guide", 1996, p. 175.

P.S. Maruvada, "Corona in Transmission Systems", Book, Eskom, South Africa, 2011.

C. Gary, D. Cristecu and D. Dragan, "Distortion and Attenuation of Travelling Waves caused by Transient Corona", CIGRE TB 55, 1989.

T. Noda, T. Ono, H. Matsubara, H. Motoyama, S. Sekioka, A. Ametani, Charge-Voltage Curves for Surge Corona on Transmission Lines: Two Measurement Methods, IEEE Transactions on Power Delivery, vol. 18, No. 1, Jan. 2003, pp. 307-314.

F.A.M. Rizk,"Negative Impulse Ground Wire Corona Parameters for Backflash Evaluation of High Voltage Transmission Lines", Accepted for publication, IEEE Transactions on Power Delivery, 2021.

M. Darveniza, F. Popolansky, E.R. Whitehead, "Lightning Protection of UHV Transmission Lines", Elektra 41, 1975, pp. 39-69.

IEEE Guide for Improving Lightning Performance of Transmission Lines, IEEE Std. 1243-1997.

A.V. Korsuntcev, "Application of the theory of similitude to the calculation of concentrated ground electrodes", Elektrichestvo, No. 5, May 1958, pp. 31-35.

F.A.M. Rizk, "Switching Impulse Strength of Air Insulation: Leader Inception Criterion", IEEE Transactions on Power Delivery, vol. 4, No. 4, Oct. 1989, pp. 2187-2195.

C.A.E. Uhlig, "The ultra corona discharge, a new phenomenon occurring on thin wires", High Voltage Symposium, NRC, Ottawa, Canada, 1956.

F.A.M. Rizk, "Analysis of space charge generating devices for lightning protection: performance in slow varying fields", IEEE Transactions on Power Delivery, vol. 25, No. 3, Jul. 2010, pp. 1996-2006.

F.A.M. Rizk, "Exposure of Overhead Conductors to Direct Lightning Strikes: Modeling of Positive Streamer Inhibition", IEEE Transactions on Power Delivery, vol. 26, Issue 2, Apr. 2011, pp. 1156-1165.

A.J. Eriksson, "The Incidence of Lightning Strikes to Power Lines", vol. 2, No. 3, Jul. 1987, pp. 859-870.

\* cited by examiner

POWER TRANSMISSION TOWER STRUCTURE WITH EMBEDDED GROUND CONDUCTOR FOR IMPROVING LIGHTNING PERFORMANCE AND METHOD FOR DETERMINING LOCATION AND EFFECT OF EMBEDDED CONDUCTOR

CROSS-REFERENCE TO RELATED APPLICATIONS

This application is a National Entry Application of PCT application No. PCT/CA2021/051737 filed on Dec. 6, 2021 and published in English under PCT Article 21(2), which itself claims benefit of U.S. provisional application Ser. No. 63/121,497, filed on Dec. 4, 2020. All documents above are incorporated herein in their entirety by reference.

The present invention relates to a lightning protection device.

BACKGROUND OF THE INVENTION

Power line conductors are normally shielded from direct lightning strikes by appropriately placed overhead ground wires. The conductors can still be directly struck due to a shielding failure, when the downward stepped leader manages to evade ground wire protection [1]. For well-protected lines shielding failure rates are typically below 1 strike per 100 km·year. The situation varies of course with lightning severity in the region concerned, conductor topology and line voltage. Far more often though the shield wire itself is struck or occasionally the tower top is struck. For a short period of time, typically a few microseconds, the shield wire or the tower top is exposed to an impulse type potential rise. This could be sufficient to cause flashover of one or more line insulator strings. This is called backflash since normal flashover occurs when the conductor voltage, rather than the shield wire or tower top, is exposed to the impulse type overvoltage. Experience shows that backflash is more prevalent in regions of high ground resistivity and high ground flash density and where it becomes difficult and economically prohibitive to provide the tower with sufficiently low footing resistance. For complex reasons related to conductor proximity [2], [3], [4], multi-circuit lines and particularly compact lines, are more vulnerable to both shielding failures and backflash.

Usually lines below 400 kV are vulnerable to backflash, while above 500 kV, as the insulator string length and consequently insulation strength increases, shielding failures tend to dominate.

As better grounding becomes impractical or uneconomic, a solution to the backflash problem is through the costly installation of line arresters, sometimes across every insulator string on every tower. Maintenance of such arresters is an added burden. On compact line designs there might not be sufficient space available to accommodate the line arresters.

PRIOR ART

It has been proposed to install ground wires below the line in order to increase the coupling factors to the lower conductors [5], [6], which would improve backflash performance by reducing the net impulse voltage stress across the lower insulator strings while having limited benefit to the upper insulator strings.

In selecting the height of the underbuilt ground wire, it is necessary to maintain adequate insulation distance to the lower power conductors, taking into account the fact that for a given span, power conductors sag more than ground wires. Particularly the power conductor sag would depend on load current as well as on ambient climatic conditions.

An obvious inconvenience with underbuilt ground wires is that they infringe on the conductor clearance to ground which is normally needed for free movement under the line of vehicles of large height, such as some agricultural machines.

Underbuilt ground wires are much closer to the lower power conductors as compared to the upper ones. This dissymmetry relative to the load current carrying power conductors results in significant magnetically induced current flow in the underbuilt ground wires. This current flow amounts to increased power losses.

For these reasons there has been a general lack of theoretical and experimental field investigations into underbuilt ground wires and accordingly their practical application in operating high voltage transmission lines.

SUMMARY OF THE INVENTION

A power transmission tower structure that includes an embedded ground conductor or conductors for improved lightning performance. An embedded ground conductor is defined as a grounded conductor, preferably streamer-inhibited, who's exact optimum position is determined by detailed travelling wave simulation of a lightning strike, considering the influence of the general layout of the power conductors, the overhead ground wires and a novel more accurate method for calculating the effect of height on ground wire corona and its subsequent effect on surge impedance which thus makes it possible to find the optimized coupling factors to all the power conductors and maximize the combined reduction of stress on all insulators strings simultaneously.

Typically, the embedded conductor is attached at or in the vicinity of the vertical axis of the power conductor system in a position that lies above the attachment points of the lower conductors but below the upper conductors. Additionally, the clearance between such an embedded conductor and any power conductor must be sufficient to sustain any voltage stress experienced under both normal operating and switching conditions.

The presence of the embedded ground conductor reduces stress on insulator strings through increased electromagnetic coupling. This can result in an improvement of the backflash rate by a factor of 10 or more.

Physically a streamer inhibited conductor is effectively identical to the conductors described in U.S. Pat. No. 7,468,879 B2, however the present conductor would not be installed at the same locations on power transmission towers nor is it used for the same purpose. Whereas the conductors in U.S. Pat. No. 7,468,879 B2 are meant to affect the incidence of lightning to the line and are installed at the same locations that traditional overhead ground wires are currently installed, the present conductor is embedded among the power conductors, where no grounded conductor has ever previously been installed and is meant to affect the performance of the line once the line has already been struck by lightning. The present streamer inhibited conductor has the ability to produce corona exclusively in the glow mode over a broad voltage range, impulse front steepness and has a reduced surge impedance. This makes it possible to install such a grounded wire in close proximity to live power conductors without adverse effects such as radio interference and audible noise that would be introduced by any other conductor due to induced charges and as well as improve electromagnetic coupling as a result of the reduced surge impedance of the conductor.

In embodiments, there is provided a method for determining a location of installation of at least one embedded ground wire on a power transmission tower structure including at least one existing ground wire and power conductors for improved lightning performance thereof, said method comprising:

a1) without said embedded ground wire being installed on said power transmission tower structure, calculating a peak impulse voltage $U_{insn}$ impressed across an insulator string n using the following formula:

$$U_{insn} = U_{tn} - U_{gw} * \frac{Z_{mgwn}}{Z_{gw}} - U_{pfn} \quad (12)$$

wherein:
$U_{tn}$: is a transient voltage at a relevant point on the power transmission tower structure,
$U_{gw}$: is a transient voltage on the existing ground wire, comprising a ground and a tower component,
$Z_{gw}$: is a surge impedance of the existing ground wire in corona,
$Z_{mgwn}$: is a mutual surge impedance between the existing ground wire and a phase conductor n,
$U_{pfn}$: is a time varying power frequency voltage of phase n;

a2) determining an effect of corona on any ground wire by calculating a radial distance bridged by negative streamers for any applied peak impulse voltage;

a3) determining soil ionization effects on a tower footing resistance of said power transmission tower structure;

a4) performing transient voltage simulation to determine an effect of said steps a2) and a3) on said peak impulse voltage $U_{insn}$;

b) installing said embedded ground wire on said power transmission tower structure, said embedded ground wire being placed at an initial height Ho, and repeating said steps a1), a2), a3), a4) to determine an improved critical current by using the following equation:

$$U_{insn} = U_{tn} - U_{gw} * \frac{Z_{mgwn}}{Z_{gwe}} - U_a * \frac{Z_{man}}{Z_a} - U_{pf} \quad (13)$$

$Z_{gwe}$: is a surge impedance of the existing ground wire in corona, modified due to mutual coupling to said embedded ground wire,
$U_a$: is transient potential of said embedded ground wire,
$Z_{man}$: is a mutual surge impedance between said embedded ground wire and phase conductor n,
$Z_a$ is a surge impedance of said embedded ground wire, which also includes mutual coupling to the existing ground wire as well as said corona effect;

c) vary a height of the embedded ground wire by an amount ΔH, and repeat said step b) in order to determine the critical current; and d) repeat said step c) until the critical current reaches a maximum value, whereby a corresponding embedded ground wire height is at an optimum position for an overall backflash performance of a power transmission line of said power transmission tower structure.

Model Formulation I

Much information is already available on mean negative streamer gradient from standard lightning impulse breakdown tests on long air gaps [8], [9]. The results often refer to the 50% breakdown level. With a recommended standard deviation of 3% for lightning impulse tests [13], the following expressions for the dependence of the negative streamer gradient $E_{sn}$, at the 1-26 level, on streamer length $I_s$ were obtained.

For $I_s>0.4$ m:

$$E_{sn} = 630 + \frac{202}{l_s} \left(\frac{kV}{m}, m\right) \quad (1)$$

For $0.05<I_s<0.4$ m:

$$E_{sn} = \frac{1068}{l_s^{0.132}} \left(\frac{kV}{m}, m\right) \quad (2)$$

Critical Penetration Field

As in [7] it was assumed that the critical negative streamer penetration field in a long gap would depend on the degree of applied field nonuniformity. This has been characterized by a nonuniformity factor $E_p/E_{av}$, where $E_p$ is peak voltage gradient at the high voltage electrode and $E_{av}$ its mean value along the streamer path.

In a lightning impulse breakdown in a conductor- or rod-plane gap of length d, the applied voltage U can here be expressed as:

$$U = E_{sn} * d \quad (3)$$

$E_{sn}$ is obtained from (1) or (2) above, with $I_s=d$.

It is clear that for breakdown to occur, negative streamers have to bridge practically the whole gap, and the critical penetration field $E_c$ would therefore be identical to the applied field $E_g$ in the vicinity of the plane. For a simple configuration such as conductor above ground, with any conductor radius $r_0$, both $E_p$ and $E_g$ can be determined analytically, while $E_{av}$ is simply the streamer gradient $E_{sn}$. For more complex configurations, $E_p$ and $E_g$ can be determined numerically by Charge Simulation.

FIG. 2 shows the variation of the critical negative streamer penetration field $E_c$ with the field nonuniformity factor for the conductor-plane configuration, with different values of the conductor radius $r_0$. Contrary to the situation with positive streamers [7] where $E_c$ does not depend on $r_0$, here $E_c$ is found to be higher at smaller conductor radius. The reason is that for different radii the same field nonuniformity factor is reached at different gap spacings. This in turn results in different values of the negative streamer gradient. For positive polarity on the other hand the streamer gradient is sensibly constant.

Corona Boundary

For any impulse voltage Um applied to a conductor above ground the potential, and field distributions U(z) and E(z) are determined for any point at a height z above ground. An initial streamer length is assumed. $E_p$, $E_{av}$ and accordingly the field nonuniformity factor are determined. Using the results of FIG. 2, the critical penetration field $E_c$ is established and compared to the actual value of E(z), calculated at the end point of the assumed streamer length. An iterative process follows in order to determine the streamer length at which the critical $E_c$ and actual value $E(z)$ coincide. This determines the corona boundary for the voltage level concerned.

In [11] a similar process is used except for the assumption that $E_c$ is constant at 1500 kV/m as mentioned above. In [12] the conductor capacitance per unit length $C_{tot}$ of the conductor in corona is determined from:

$$C_{tot}=C_n+k^*(U_m-U_{ci}) \quad (4)$$

$C_n$ is the geometric capacitance per unit length, Um is the peak-applied voltage, $U_{ci}$ the corona onset voltage of the conductor and k a corona constant. There is no general consensus on the value of k [12], [13], [15]. In reference to the CIGRE method, a value of k amounting to 0.0033 pF/kV·m has been adopted in this paper [13], [15]. When required the corona boundary radius corresponding to $C_{tot}$ can be easily determined.

FIG. 3 shows present model results on the variation of the corona constant k with the peak voltage level above corona onset, for a 1.5 cm conductor 30 m above ground.

It is shown that the corona constant, assumed constant in the CIGRE method [12], decreases significantly with voltage over the wide range investigated. It is concluded that the linear relationship (4), widely applied, can only be accepted as a rough approximation. The reason that such relationship has been around for so long is that in the determination of the surge impedance, the geometric capacitance is added to the corona capacitance and furthermore the square root is taken. This masks the rough assumption undertaken in the linear relationship (4), despite the well-known highly nonlinear nature of corona.

A comparison of the dependence of the negative streamer boundary radius on peak applied voltage for a 1.5 cm ground wire at 30 m height above ground, as determined by the two previous methods and by the present model, is shown in FIG. 3.

Except at lower voltages not relevant to backflash on HV lines, the discrepancies between the results based on [11], [12] are found excessive. The assumption by Anderson [11] of a critical streamer penetration gradient of 1500 kV/m appears too restrictive. FIG. 2, which is based on extensive experimental results, shows that negative streamers can penetrate regions where the applied electric field is much lower than 1500 kV/m. In the lower voltage range in which the CIGRE formula (4) above is based on experimental results, the agreement with the present model is closer. Above 2500 kV however where no experiments were undertaken by CIGRE, the results substantially deviate.

It should be noted however that the effective radius of the conductor in corona would be far less than the corona boundary radius shown in FIG. 4. The reason is that while the corona boundary may be assumed to determine the conductor capacitance, the inductance remains unchanged, which in turn limits the effect of corona on surge impedance. From such modified surge impedance an equivalent radius of the conductor in corona can be easily determined. FIG. 5 shows the corresponding variation of the effective radius of the above ground wire (GW) with peak voltage. It is shown that the effective radius is smaller by an order of magnitude than the corona boundary radius. Obviously, the same observations on comparison between the different methods remain.

Conductor Surge Impedance
Effect of Impulse Voltage

The corona boundary radius determined as described above was used to determine the dependence of the conductor capacitance and surge impedance in corona on the applied negative impulse voltage. In these calculations the conductor height above ground was maintained at 30 m. Model results were compared with those obtained using the methods of [11], [12] in the negative impulse peak voltage range of 1250 kV to 4000 kV. FIG. 6 shows that for this conductor height, there is generally closer agreement between the CIGRE method and the present model. Except for lower voltages of little practical interest for backflash, the surge impedance based on [11] is simply too high, indicating that such method tends to underestimate the effect of corona.

Effect of Conductor Height

The model was used to determine the effect of conductor height above ground on corona surge impedance, for a fixed negative impulse voltage level. FIG. 7 shows variation of the surge impedance of the conductor in corona with height above ground, in the range of 15 to 50 m, at a fixed negative impulse voltage level of 3000 kV. Comparison is shown of the present model results to predictions of the methods of Anderson [11] and CIGRE [12]. Again, it is found that surge impedance values according to [11] are simply too high, underestimating corona effect. It is clear that the CIGRE method [12] shows little effect of height on surge impedance. This defies physical reasoning, since for the same impulse voltage more intense corona will develop; the closer the conductor is to ground.

Model results on the other hand show a tendency of lower surge impedance in corona, under the same impulse voltage, as the ground plane is approached, in agreement with the above physically based reasoning. This defect in the CIGRE method is caused by the assumption implied in (4) above, that the constant k is independent of conductor height. This is a fundamental aspect that will be treated below in more detail, since it contributes to the confusion in the selection of such constant referred to previously.

Determination of Corona Constant

In negative impulse tests on conductors above ground the corona capacitance could be determined from the total conductor charge in corona $Q_{tot}$ per unit conductor length occurring at the impulse peak [12]:

$$C_{tot}=Q_{tot}/U_m \quad (5)$$

$$C_{tot}=C_n+C_{cor} \quad (6)$$

Equation (4) is then used to determine the corona constant k [12]. Some typical results and analysis will be given in the section dealing with comparison with experiments.

Another method determines the dynamic corona capacitance from the rate of change of the conductor charge per unit length with voltage on the steep part of rise prior to the voltage impulse peak:

$$C_d=dQ/dV \quad (7)$$

The dynamic capacitance per unit length $C_d$ is then expressed as the sum of the geometrical capacitance of the conductor per unit length and the corresponding corona capacitance per unit length $C_{cor}$:

$$C_d=C_n+C_{cor} \quad (8)$$

$C_{cor}$ is then expressed as:

$$C_{cor}=k_w^*(U_m-U_{ci}) \quad (10)$$

The constant $k_w$ is taken as twice $k_c$ [13], which from comparison of (9) and (10) is valid only as long as $U_c$, is much smaller than $U_m$.

The first method for determination of the effective corona capacitance appears more suited for estimation of the surge impedance needed in the backflash application, which is the ultimate objective of the present paper. The second method on the other hand is more applicable to studies of damping and attenuation of travelling waves on transmission lines.

A question frequently asked is whether the corona constant k varies with the conductor radius. Model results in Table 1 based on the present Model show that for single conductor ground wires the corona constant is practically independent of the conductor radius.

TABLE 1

Dependence of the corona constant k, on conductor radius. $H_c$: 30 m, Um: 3 MV.

| $r_0$, cm | $C_{tot}$-$C_n$, pF/m | k, pF/kV · m |
|---|---|---|
| 0.50 | 8.86 | 0.00321 |
| 0.75 | 8.53 | 0.00318 |
| 1.00 | 8.23 | 0.00315 |
| 1.25 | 7.97 | 0.00313 |

Comparison with Experiments

The experiments in [10] constitute the basis of the CIGRE Method [12] and will be treated here in great detail. Laboratory impulse tests of both polarities were conduced on test lines of heights 5 m, 7.5 m and 8.25 m. The test line was short having an effective length of 8 m, with the laboratory wall only 7 m away, resulting in significant proximity effect.

The conductor diameters were 10 mm, 26.4 mm and 65 mm. The highest impulse voltage was necessarily limited, amounting to 2 MV. Only a single impulse application was reported at every voltage level. We are therefore obliged to treat the results as one population, ignoring secondary effects of conductor height and diameter.

FIG. 8 shows test results relating corona capacitance per unit length and the voltage level above corona onset, $U_m$-$U_{ci}$. Also shown is a straight line with a slope of 0.0033 pF/kV·m recommended by IEC [14]. It is shown that the dispersion of the measuring points is excessive and the straight-line relationship can only be accepted as a rough approximation.

It is noted that (5), (6) above imply that at the voltage peak the conductor charge amounts to $C_n*U_m$, while it is generally accepted that above corona onset, the conductor gradient does not go much above the onset gradient $E_{ci}$ [16], corresponding to a conductor charge of $C_n*U_{ci}$.

With this modification in mind, the present model was used to determine the corona capacitance for conductors of different heights in the range of 10-50 m and impulse voltages in the range 1250-4000 kV. It was found that the two dimensionless variables $C_{cor}/C_n$ and $(U_m-U_{ci})/U_{ci}$ can be related by a general expression of the form:

$$C_{cor}/C_n = a*((U_m-U_{ci})/U_{ci})_b \tag{11}$$

Where the constants "a" and "b" generally decrease as conductor height is increased. This means, as to be expected, that under the same voltage corona will be more intense on a lower conductor. The experimental results of FIG. 8 are presented in the format of (11) above, as shown in FIG. 9. It is noted that here the dispersion is significantly less and the trend is clearer. This appears to support the nonlinear formulation and the constant gradient on the conductor surface for voltages above corona onset.

Extensive numerical evaluation of model results showed that the relative increase in the total conductor capacitance due to corona $(C_{tot}-C_n)/C_n$, can also be approximately determined from expression (11), for heights of 10-50 m and voltages of 1250-4000 kV, using the constants "a" and "b" of FIG. 10.

Finally another finding of the model is that the corona constant k as defined in the CIGRE method varies considerably with conductor height. FIG. 11 shows that k varies by a ratio of 2.5 to 1 in the conductor height range of 10-50 m. This contributes to explain the prevailing confusion about the value of k [13]. The experimentally based points added appear to support the trend.

Model Formulation II

When a transmission tower or ground wire is struck by lightning, the relevant variables for back flashover calculations can be explained by the simplified equations (12), (13) below.

For an ordinary line with one original or existing ground wire the peak impulse voltage impressed across insulator string n can be expressed as:

$$U_{insn} = U_{tn} - U_{gw} * \frac{Z_{mgwn}}{Z_{gw}} - U_{pfn} \tag{12}$$

$U_{tn}$: transient voltage at the relevant point on the power transmission tower structure, $U_{gw}$: transient voltage on the existing ground wire 3, comprising a ground and a tower component, $Z_{gw}$: surge impedance of the existing ground wire 3 in corona, $Z_{mgwn}$: mutual surge impedance between the existing ground wire 3 and phase conductor n, $U_{pfn}$: time varying power frequency voltage of phase n, In equation (12) the ratio of surge impedances is termed the coupling factor. For otherwise the same conditions, it is clear that the higher the coupling factor, the lower the voltage experienced by the insulator string. This will occur the higher the mutual impedance and the lower the surge impedance of the ground wire. Lower surge impedance can be realized if double ground wires are used. It will also result from corona, which will increase the effective capacitance of the ground wire. The mutual surge impedance however can be little manipulated since it is dictated by geometry.

With an added ground wire, underbuilt, embedded or otherwise, equation (12) can be modified as:

$$U_{insn} = U_{tn} - U_{gw} * \frac{Z_{mgwn}}{Z_{gwe}} - U_a * \frac{Z_{man}}{Z_a} - U_{pf} \tag{13}$$

$Z_{gwe}$: surge impedance of the existing ground wire (GW) 3 in corona, modified due to mutual coupling to the added embedded ground wire (GW) 4, $U_a$: transient potential of the added embedded ground wire (GW) 4, $Z_{man}$: mutual surge impedance between the added embedded ground wire (GW) 4 and phase conductor n, $Z_a$ surge impedance of the added embedded ground wire (GW) 4, which also includes mutual coupling to the existing ground wire (GW) 3 as well as corona effect.

It is clear from equation (13) that the additional embedded ground wire (GW) 4 will relieve the insulator string voltage through reinforced coupling, and that its benefit will be higher as it is brought as close to the phase conductor in question as permissible.

In this paper the effect of an embedded ground conductor on back flashover performance will be systematically investigated. A transient travelling wave program is used to perform the numerical simulations. The assumed lightning stroke current has a linear rise on a 2 μs front and a very long tail. The tower is represented by simple surge impedance [12]. Nonstandard insulator withstand voltage is evaluated at 2 μs and occasionally at 6 μs, using a voltage-time curve proposed in [19] and adopted by IEEE [12].

Effects of GW corona and soil ionization with concentrated ground are of particular importance and will be treated below in some detail.

The CIGRE log-normal probability distribution of negative first stroke currents [12] will be used, since it constitutes a better representation of field data, particularly in the higher current range, most relevant for back flashover investigations [5]. The simpler IEEE distribution [20] on the other hand deviates considerably in that range, resulting in a probability that is 1.3 times the CIGRE value at 100 kA, the ratio increasing further to 2.5 at 150 kA and 5.1 at 200 kA.

Effect of Corona

The first step in the assessment of the effect of corona is to determine the radial distance bridged by the negative streamers for any applied peak impulse voltage.

Traditionally there have been two methods available to determine the radius of the corona envelope. Anderson [11] assumed that negative streamer propagation will stop if the ambient geometrical applied field drops below a critical value of 1500 kV/m. In [12] a linear relationship is assumed between the increased capacitance of the conductor due to corona and the applied impulse voltage. If needed the capacitance of the conductor in corona could be used to obtain the radius of the corona envelope and the associated critical field. Based on tests [21] the author determined [18] that such assumed linearity constitutes only a rough approximation.

Based on extensive available material on negative impulse breakdown of long air gaps, it was shown [18] that the critical field for negative streamer propagation is a function of the applied field nonuniformity along the streamer path. FIG. 12 shows variation of the critical field with the nonuniformity factor, defined as the ratio between the maximum and average voltage gradients, for 1 cm and 1.5 cm ground wires. The critical field is far from being a constant and reaches levels far below 1500 kV/m [11]. For the same nonuniformity factor the critical field slightly decreases with the wire diameter.

FIG. 13 shows variation of the negative streamer critical penetration field for a 1.5 cm conductor, 30 m above ground with the applied peak impulse voltage, as obtained by the methods of [18], and [12], the latter with a corona constant of 0.0033 pF/kV·m as recommended in [5].

With both methods the critical field varies in a wide range and again is much lower than the 1500 kV/m proposed in [11] and used widely within IEEE. In further calculations in this paper the more rigorous method of [18] will be applied. The radius of the conductor in corona $r_c$ at the relevant voltage is obtained through an iterative process. Once $r_c$ is determined, calculation of the conductor capacitance and surge impedance in corona is straightforward.

Soil Ionization

Korsuntcev [22] introduced an approach to account for the effect of soil ionization on footing resistance, based on application of the theory of similitude to extensive experimental results on concentrated ground electrodes.

In [12] a simple formula involving the ratio between the current $I_R$ injected into ground and the critical current for a spherical electrode $I_{gc}$, was introduced as an approximation to the detailed Korsuntcev procedure A comparison was made between calculations of the ratio $R_i/R_0$ of ionized to nonionized footing resistances using both the detailed analysis and the proposed CIGRE approximation. This involves a SC SGW 245 kV line described in Section III below, at critical backflash conditions. It is shown in Table 2 that when $I_R$ is below or close to $I_{gc}$, significant discrepancy occurs. Here $E_0$ is a critical soil gradient and L a characteristic maximum dimension of ground electrodes [22]. In this paper therefore only the detailed Korsuntcev method will be used.

TABLE 2

Effect of soil Ionization Detailed Vs. CIGRE Approximation
$E_0 = 400$ kV/m, L = 10 m

| $\rho$, Ω·m | $R_0$, Ω | $I_{gc}$, kA | $I_R$, kA | $I_R/I_{gc}$ | $R_i/R_0$ Detailed | $R_i/R_0$ Approx. |
|---|---|---|---|---|---|---|
| 250 | 10 | 159.2 | 122.2 | 0.77 | 0.99 | 0.75 |
| 500 | 20 | 79.6 | 109.4 | 1.37 | 0.76 | 0.65 |
| 750 | 30 | 53.1 | 76.6 | 1.44 | 0.74 | 0.64 |
| 1000 | 40 | 39.8 | 44.5 | 1.12 | 0.84 | 0.69 |
| 1500 | 60 | 26.5 | 31.5 | 1.19 | 0.82 | 0.68 |
| 3000 | 80 | 29.8 | 24.5 | 0.82 | 0.97 | 0.74 |

Model Application
Line Parameters

The 245 kV SC SGW investigated has a 250 m span and the ground wire attachment height is 31 m. The attachment heights of the upper and two lower phases are 22 m and 14.44 m respectively. The lateral displacements of the upper and lower phases are −3.7 m, 4 m and −4 m.

The 345 kV DC DGW has a 300 m span. The attachment height of the ground wire amounts to 31.9 m and those of the upper, middle and lower phases are: 27.37 m, 20.36 m and 13.35 m respectively. The corresponding lateral distances are: 3.87 m, 4.67 m, 5.33 m and 5.79 m.

The 420 kV DC DGW line has a 300 m span and the ground wire attachment height is 50 m while those of the upper, middle and lower phases are: 43 m, 29 m and 17 m respectively. The corresponding lateral distances are: 6 m, 5.5 m, 10.24 m and 5.5 m.

Embedded Conductor Position

With regard to coupling, as mentioned above, it will be beneficial to bring the embedded conductor as close as permissible to the phase conductor. Under lightning conditions dielectric integrity will be maintained if the phase conductor-embedded conductor clearance is equal to or larger than the phase conductor to tower leg gap. With an embedded conductor attached at the middle of the structure, the above condition is clearly satisfied. The maximum positive switching overvoltage will then cause the critical stress. Variation of the critical switching impulse withstand voltage of a phase conductor-ground conductor clearance with gap length has been determined by an experimentally validated procedure described in [23].

The results are shown in FIG. 14 for clearances between the phase and embedded conductor of up to 6 m, with both conductor heights at 20 m. It is shown that for gaps below 3 m, where breakdown occurs with a streamer mechanism, the curve is linear. Above 3 m on the other hand breakdown is governed by the nonlinear leader mechanism. In that range it is found that the withstand voltage is significantly higher than that of a phase conductor-tower leg gap of equal length. This confirms that the gap factor of a phase conductor-ground wire gap is larger than that of an equal phase conductor-tower leg gap. This is to be expected due to the massive dimensions of the tower structure. The results also demonstrate that for the 245 kV line a minimum net clearance between phase and embedded conductors at midspan of only 1.2 m, after due consideration to atmospheric conditions, would be sufficient to withstand an overvoltage factor of 3. Similarly for the 420 kV line the minimum net gap required for the same overvoltage factor would be 2.1 m.

With an assumed conductor deflection angle due to wind of 30°, at maximum sag and maximum overvoltage factor, it was found that in the preferred embedded conductor position, the overall insulation integrity was always maintained.

Streamer-Inhibited Conductor

Depending on line phase conductor topology and operating conditions significant charge may be induced on the embedded ground conductor due to proximity effect. If such conductor is of the streamer-inhibited type, any positive corona that may occur will be in the glow, or ultra-corona mode [24-26]. Such conductor will not cause additional radio or audible noise under the system operating voltage [15] and is therefore recommended for use as embedded ground wire.

Tower Top Potential

FIG. 15 is a typical display of tower top potential of a SC SGW 245 kV transmission line without embedded ground conductor subsequent to a critical lightning strike. For a footing resistance $R_0$ of 80Ω, the critical stroke current for back flashover is found to be 37.65 kA. The ionized footing resistance is 77Ω, only slightly below the nonionized value. Reflection from adjacent towers is seen to arrive at 1.67 μs. The peak voltage at 2 μs reaches 2025 kV and the insulator string stress index amounts to 46.45 kV/kA.

With an embedded ground wire, also at a footing resistance $R_0$ of 80Ω, FIG. 16 shows the corresponding tower top potential determined at the substantially higher critical back flashover current of 100.47 kA. Due to the larger current $I_R$ injected into ground, the ionized footing resistance $R_i$ is found to be significantly lower than $R_0$. At this much higher critical current the tower top peak potential is determined at 3517 kV, however the corresponding insulator string stress index has been reduced to only 17.44 kV/kA, a substantial 62.5% reduction.

Surge Impedance in Corona

FIG. 17 shows the effect of corona on the surge impedance of a 1.5 cm diameter ground wire of height 30 m as function of the peak impulse voltage in the range of 1500 kV to 4500 kV. These are per unit values with the geometric surge impedance as a base. It is shown that at 4500 kV corona caused approximately a 40% reduction in the surge impedance. Also shown in FIG. 17 is the variation of the per unit surge impedance of a 1.5 cm embedded ground wire at 20 m height. Again the reduction due to corona is substantial. It is concluded that the effect of corona should not be ignored in back flashover calculations.

Effect of Soil Ionization

Table 3 shows the effect of soil ionization on footing resistance of a 420 kV DC DGW transmission line, at critical back flashover currents, for different values of the tower footing resistance. The results are shown with and without embedded ground conductor. The effect of soil ionization is found to be quite significant, in particular in the presence of embedded ground conductor, since under otherwise the same conditions, the current $I_R$ injected into ground is significantly higher.

It is concluded that for concentrated ground, soil ionization can not be ignored in back flashover investigations.

TABLE 3

Effect of Soil Ionization on Footing Resistance
420 kV DC DGW, $H_{gwt}$: 50 m, $H_{emb}$: 18-21 m

| Embedded | ρ, Ωm | $R_0$, Ω | $I_R$, kA | Ri/$R_0$ | $I_c$, kA |
|---|---|---|---|---|---|
| No | 500 | 20 | 112.9 | 0.75 | 161.7 |
| Yes | 500 | 20 | 156.4 | 0.62 | 262.5 |
| No | 1000 | 40 | 59.7 | 0.73 | 102.1 |
| Yes | 1000 | 40 | 91.7 | 0.56 | 198.0 |
| No | 1500 | 60 | 42.6 | 0.70 | 79.1 |
| Yes | 1500 | 60 | 65.0 | 0.53 | 164.8 |
| No | 3000 | 80 | 32.5 | 0.80 | 60.5 |
| Yes | 3000 | 80 | 49.8 | 0.54 | 139.4 |

Back Flashover Rate

The Model was used to determine the effect of the embedded ground wire on back flashover rate for the 245 kV, 345 kV and 420 kV transmission lines over a wide range of tower footing resistances, for ground flash density Ng=1 F/sq·km·year. In all cases the attachment height of the embedded ground conductor is equal or higher than the lower phase.

For calculation of back flashover rate the number of lightning strikes collected by the tower and ground wire (electrical shadow) is needed. This was obtained using the authors own model [1] rather than another widely used expression [27]. The reason for this preference is that in [1] modeling of lightning exposure of both ground wires and towers was undertaken. In [27] however the attractive radius of the tower was calculated while the attractive lateral distance of the GW simply assumed to be 20% shorter. However since our main objective is to determine the ratio of back flashover rates without and with embedded ground wire, the choice of the lightning exposure model becomes unimportant as long as the same model is used all through.

For the SC SGW 245 kV line, FIG. 18 shows that introduction of an embedded ground wire results in a reduction of the back flash rate by a factor of 10 or more.

FIG. 19 shows similar results for the DC DGW 345 kV transmission line. The ground wires are 7.74 m apart. For a double circuit line at such voltage the tower height of only 31.9 m makes for a compact design.

Similar results are shown in FIG. 20 for the DC DGW 420 kV transmission line. Here the tower is 50 m tall and the ground wires are 12 m apart.

FIG. 21, for a SC SW 245 kV transmission line with tall tower and long span, confirms that the ratio between backflash rates without and with embedded ground conductor is above 10, being much higher at lower tower footing resistances. While the latter trend depends on line parameters, the approximately 10-fold improvement has always been maintained or exceeded.

Finally it should be noted that contrary to the situation with underbuilt GW, the proposed placement of the embedded conductor results in a separation from the lower phase conductors that increases along the span. This is caused by the larger sag of an ACSR phase conductor compared to that of an embedded steel ground conductor. Using the expressions given in [21], the differences between the sags of the lower phase conductor and the embedded ground wire were estimated for 250 m, 300 m and 370 m spans. The sag difference estimates amounted to 1.56 m, 2.25 m and 3.42 m respectively. These are significant values considering the clearances required to withstand switching overvoltages as discussed above. The recommended positioning of the embedded ground conductor also has the advantage of not infringing on the free clearance under the transmission line.

CONCLUSIONS

1. A novel approach was developed to determine the critical field needed for a negative streamer to penetrate a nonuniform field region.

2. The method was used to determine corona boundary under negative impulse voltage in long air gaps, particularly conductor to ground plane.

3. The model was used to determine the dependence of surge impedance of a conductor in negative corona on peak impulse voltage and conductor height.

4. The model findings were compared to two methods used to account for the effect of negative corona on conductor characteristics.

5. It was determined that the method assuming constant critical field lacks physical basis and underestimates corona effect.

6. It was also found, based on model results, that the linear relationship between applied impulse voltage and the effective corona capacitance can only be accepted as a rough approximation.

7. The model also showed that ignoring the effect of conductor height on the corona constant in the CIGRE method contributes to the prevailing confusion about selection of such important parameter.

8. An embedded ground wire attached at or above the attachment height of the lower phase is proposed as novel alternative solution to the backflash problem.

9. A properly placed embedded ground wire does not infringe on the overall dielectric integrity of the line clearances.

10. A streamer inhibited embedded ground conductor is favoured due to its ultra-corona characteristics that eliminate the possibility of undesirable radio or audible noise under system operating voltage.

11. It is essential to rigorously consider the effects of corona and soil ionization and to use a statistical distribution particularly reliable at high lightning stroke currents relevant to back flashover calculations.

12. The embedded conductor results in substantial increase in the critical back flashover current and a corresponding reduction in the insulator string stress index.

13. Back flashover performance of lines provided with embedded ground conductor benefits significantly from negative impulse corona effect and from soil ionization for concentrated tower ground.

14. It has been shown that over a wide range of ground resistivities and associated tower footing resistances, the application of an embedded ground conductor results in reduction of the back flashover rate by a factor as high as 10 or more.

15. The gains in reducing the backflash rate achieved by the proposed embedded ground wire considerably exceed the corresponding levels previously reported using underbuilt conductors.

16. Contrary to an underbuilt ground wire the proposed positioning of the embedded conductor results in a separation from the lower phase that increases along the span and furthermore leaves the clearance below the transmission line free.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
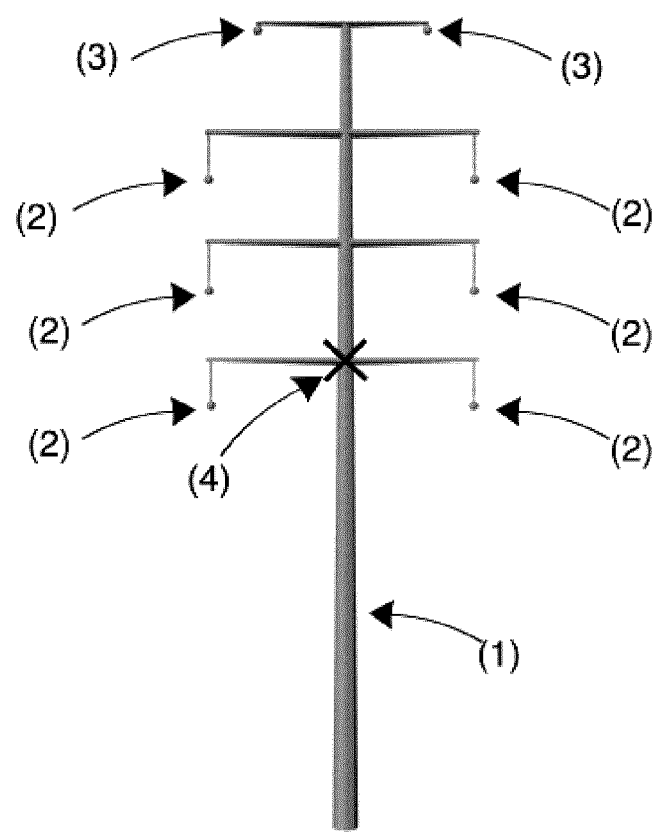
FIG. 1 is a front elevation view of an example of a power transmission tower with an embedded ground conductor and its location, according to a preferred embodiment of the present invention.

The present invention is illustrated in further details by the following non-limiting examples. Referring to FIG. 1, there is shown a power transmission tower structure 1 including power conductors 2, overhead ground wires 3, and an embedded ground conductor 4 for improved lightning performance, according to a preferred embodiment of the present invention. An embedded ground conductor 4 is defined as a grounded conductor, preferably streamer-inhibited, who's exact position shall be determined by detailed travelling wave simulation of a lightning strike, considering the influence of the general layout of power conductors 2 and overhead ground wires 3 in order to optimize the coupling factors to all conductors. Typically, the embedded conductor is attached at or in the vicinity of the vertical axis of the power conductor system in a position that lies above the attachment points of the lower conductors but below the upper conductors. A typical position X of the ground conductor 4 is indicated on the sample tower structure 1. In this example, the ground conductor 4 is located at the horizontal center of the tower structure 1. Additionally, the clearance between such an embedded conductor and any power conductor must be sufficient to sustain any voltage stress experienced under both normal operating and switching conditions The present invention uses a streamer-inhibited conductor [26], not underbuilt but rather embedded within the multiconductor system, in order to optimize the coupling factors to all conductors. This is contrary to the underbuilt ground wires, which normally improve the backflash performance of the lower conductors while implicitly assuming that little could be done to further improve performance of the upper conductor. The present invention, unlike any previous technique, recognizes that optimization of all coupling factors leads to the ultimate goal of realising the best overall backflash rate of the line.

The streamer-inhibited conductor goes into corona in the glow mode, rather than the streamer mode, often encountered on regular conductors. Since positive streamers on regular conductors constitute the primary cause of radio interference (RI) and audible noise (AN), such conductors could not be placed on the tower in locations where they may be exposed to significant induced charges. Such induced charges would vary with operating conditions including having two circuits having different voltages on the same tower or with one circuit operating while the other being out for maintenance. Additionally, corona onset of regular conductors is influenced by the presence on their surface of water droplets, making such conductors prone to RI and AN under rain. On the other hand, inhibited conductors do not manifest such environmentally undesirable effects and are electrically insensitive to rain, which provides considerable flexibility in their installation. This results in the following unique advantages:

1. A most important requirement is that the placement of the embedded streamer-inhibited conductor on the tower must not in any way adversely affect the insulation withstand characteristics of air clearances on the tower or between conductors. For EHV lines the minimum tower clearances are determined by the withstand capability of air gaps when exposed to maximum positive switching impulse overvoltages. This determines the minimum conductor-tower window or conductor-tower leg clearances as well as, of course, the spacing between conductors. Attaching a streamer-inhibited conductor to the tower at the same height or above the lower conductors would not in any way impair the insulation strength of the conductor tower clearance. This is because it has been amply demonstrated experimentally that the critical positive switching impulse breakdown voltage of a power conductor-tower leg clearance is significantly lower than that of a corresponding power conductor-smaller conductor gap (lower gap factor).

2. Under negative switching impulse overvoltage the air gap strength will be much higher than under positive polarity and does not therefore constitute a design criterion. Nevertheless if under such conditions a positive charge is induced on the streamer-inhibited conductor under operating voltage, no positive streamers will be generated from the streamer-inhibited conductor and the integrity of air insulation will be maintained.

3. Furthermore, when the streamer-inhibited conductor is placed on the tower at the same height or above the lower conductors, the separation between the power and inhibited conductors will increase along the span away from the tower. This is contrary to what happens with regular underbuilt ground wires, where the larger power conductor sagging reduces such clearance, making it sensitive to electrical load and environmental conditions.

4. The embedded inhibited conductor is not exposed to direct lightning strikes and is not intended to act as a shielding ground wire. Nevertheless, such conductor would through glow corona space charge still contribute, as a side benefit, to improve shielding performance of the line. An underbuilt ordinary ground wire would obviously offer no such advantage.

5. The onset voltage of glow corona on streamer-inhibited conductors is 2 to 3 times lower than that of a similar regular conductor [25]. According to CIGRE Guide [12], this is expected to lead to an increased effective capacitance in corona under negative impulse voltage. This in turn would decrease surge impedance and enhance coupling factors to power conductors and tend to improve back flashover performance of the line.

6. The embedded conductor, being closer to the electrical center of the power conductors results in reduced magnetically induced current from the power conductors as compared to an underbuilt conductor.

7. Extensive computer modeling of back flashover of single- and double-circuit transmission lines in the voltage range of 245 kV to 400 kV, and tower footing resistances in the range of 10 to 80 ohm, showed that the use of embedded streamer inhibited conductors could improve backflash line performance over that with underbuilt regular conductors by as much as a factor of two or more.

Figure 2:
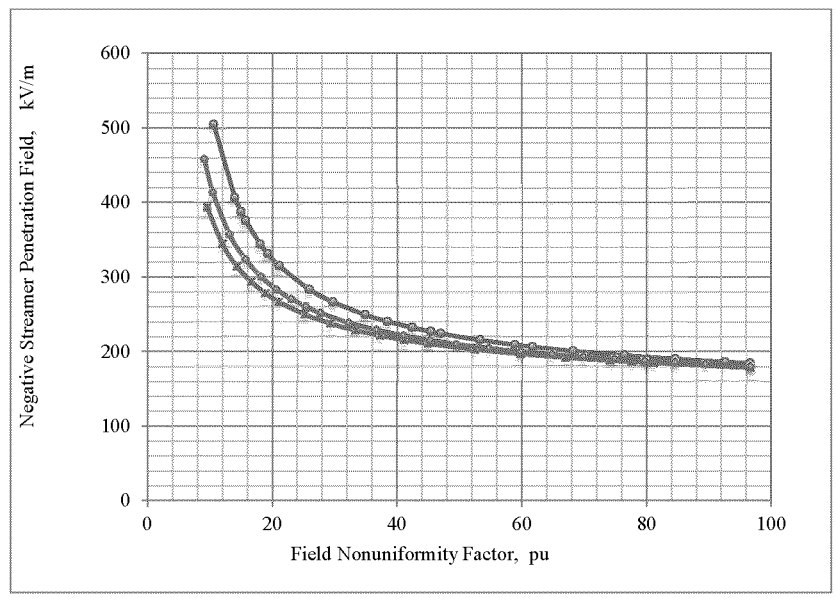
FIG. 2 is a graphic showing the variation of negative streamer penetration field with field nonuniformity, conductor-plane gap. Conductor radius, Upper: 0.75 cm, Second: 1.25 cm, Third: 1.75 cm.
Figure 3:
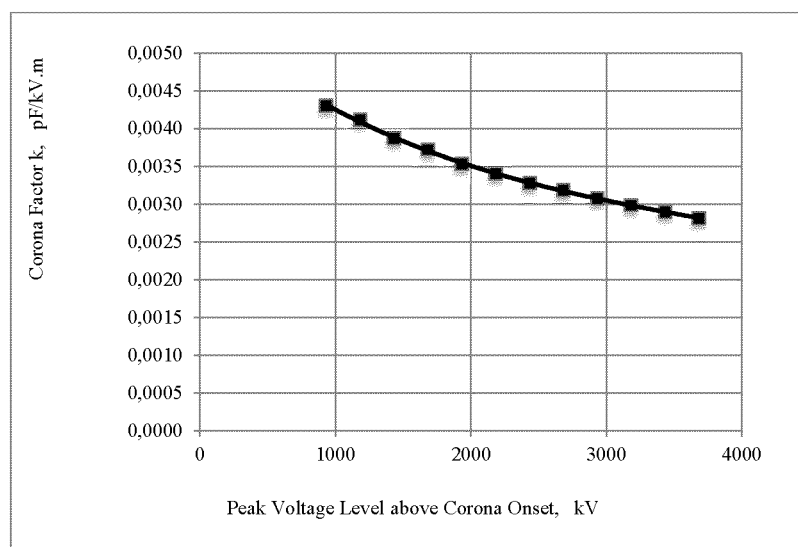
FIG. 3 is a graphic showing the variation of the corona factor k with the peak voltage level above corona onset. Conductor height: 30 m, Conductor radius: 0.75 cm.
Figure 4:
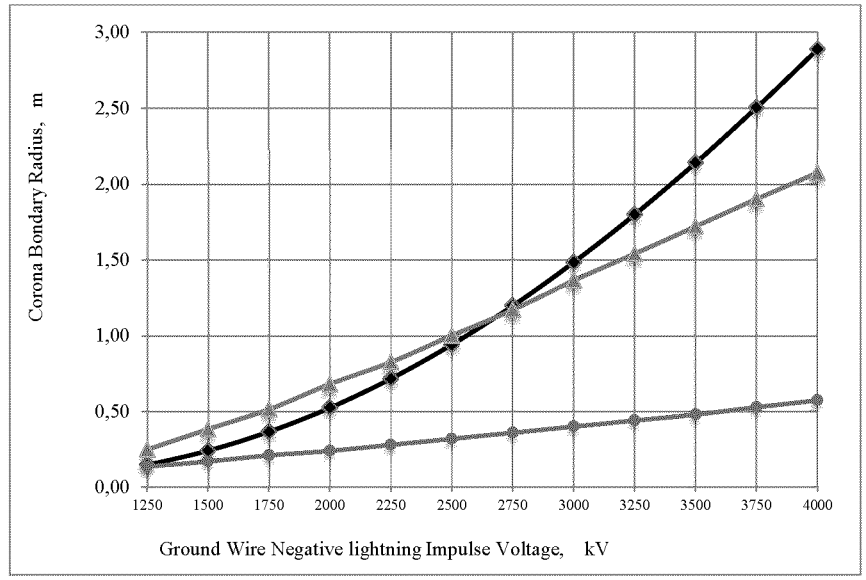
FIG. 4 is a graphic showing the variation of corona boundary radius of conductor with negative lightning impulse voltage peak. Height: 30 m and radius: 0.75 cm. CIGRE Method (Diamond), Present work (Triangle), Anderson (Round) [11].
Figure 5:
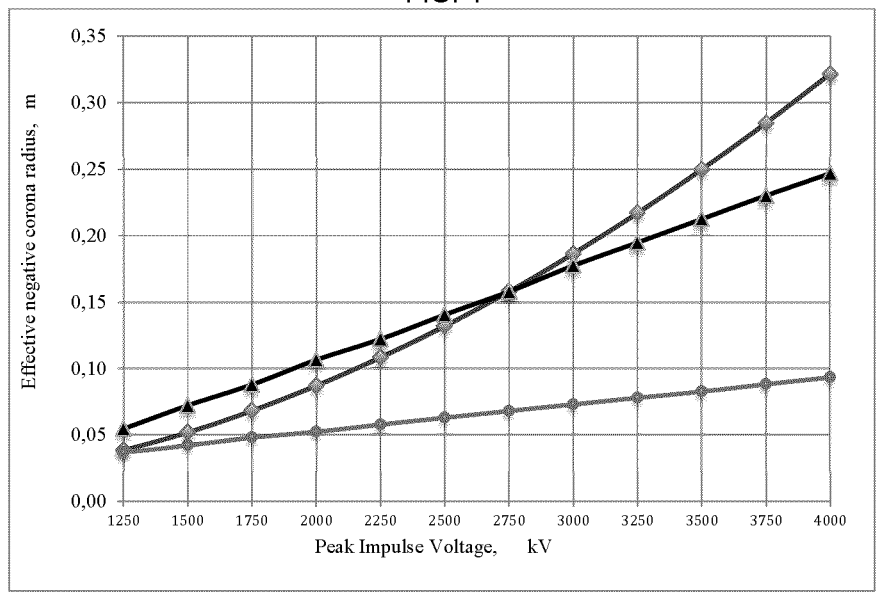
FIG. 5 is a graphic showing the effect of negative impulse voltage on effective corona radius. Conductor height: 30 m, conductor diameter: 1.5 cm. CIGRE Method (Diamond), Present Work (Triangle), Lower: Anderson [11].
Figure 6:
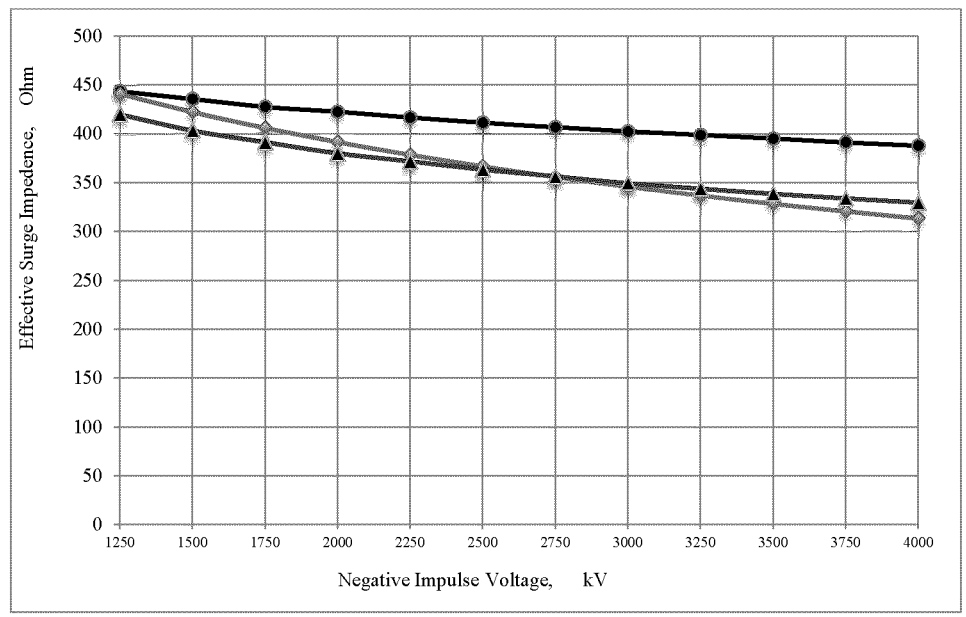
FIG. 6 is a graphic showing the dependence of single conductor effective surge impedance on applied negative impulse voltage, Upper (Round): Anderson [11], Present Work (Triangle), CIGRE method (Diamond) [19]. $r_0$: 0.75 cm, h: 30 m.
Figure 7:
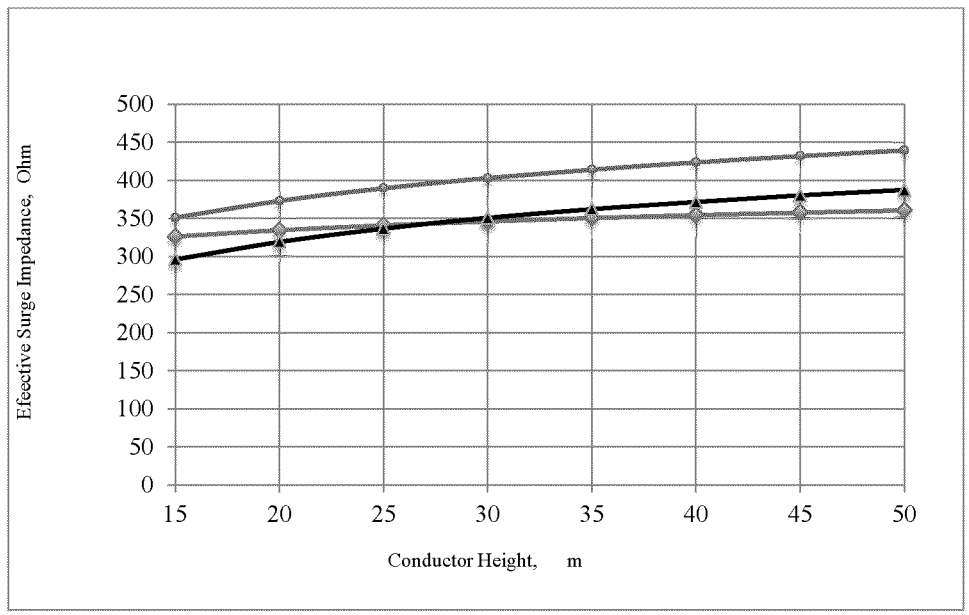
FIG. 7 is a graphic showing the variation of effective surge impedance under negative corona with conductor height. Upper: Anderson [11], Triangle points: Present Work, Diamond: CIGRE [12]. $r_0$: 0.75 cm, $U_m$: 3000 kV
Figure 8:
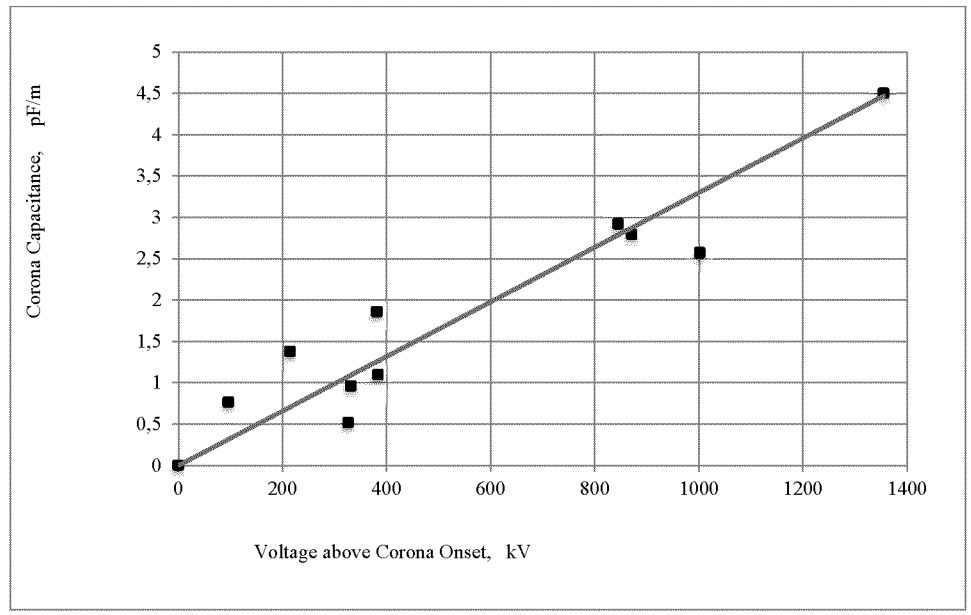
FIG. 8 is a graphic showing the variation of conductor corona capacitance with peak impulse voltage above corona onset $U_m - U_{ci}$. Points: experiments [10]. Straight line: IEC Standard recommendation with a slope of 0.0033 pF/kV·m.
Figure 9:
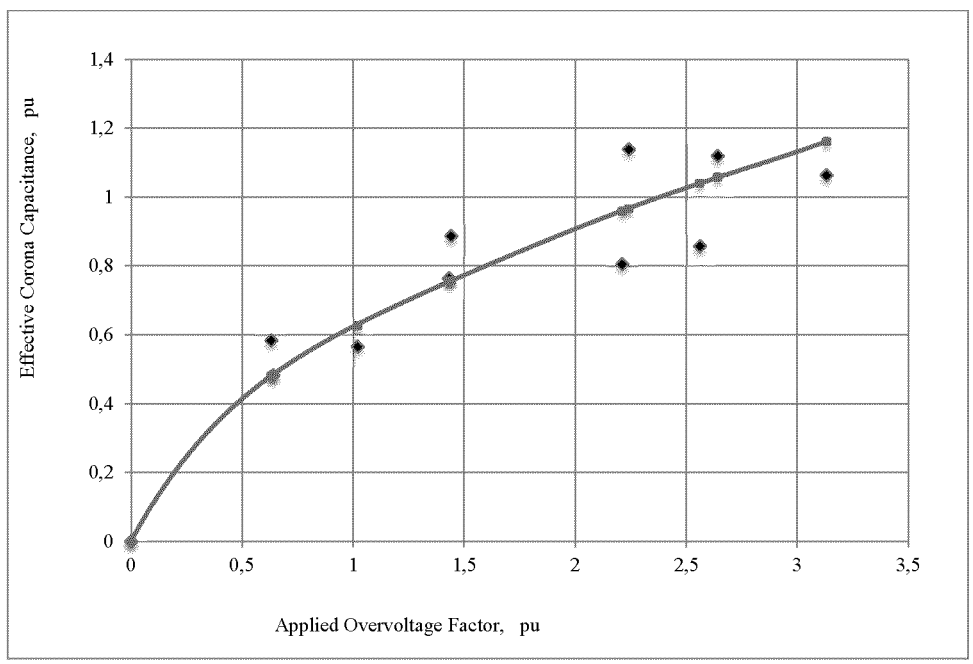
FIG. 9 is a graphic showing the variation of the capacitance ratio $C_{cor}/C_n$ with overvoltage factor $(U_m - U_{ci})/U_{ci}$, obtained from [10]. Measurements: (Diamond), Model-based formula (Square)
Figure 10:
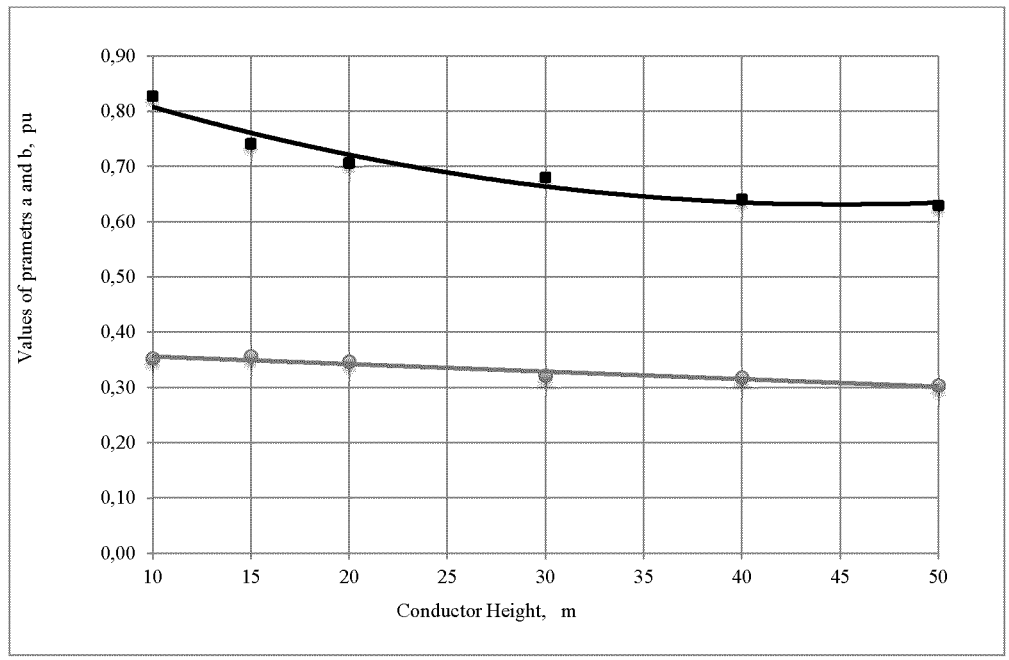
FIG. 10 is a graphic showing the variation of the corona parameters "a" (Lower) and "b" (Upper) with conductor height. Conductor diameter: 1.5 cm.
Figure 11:
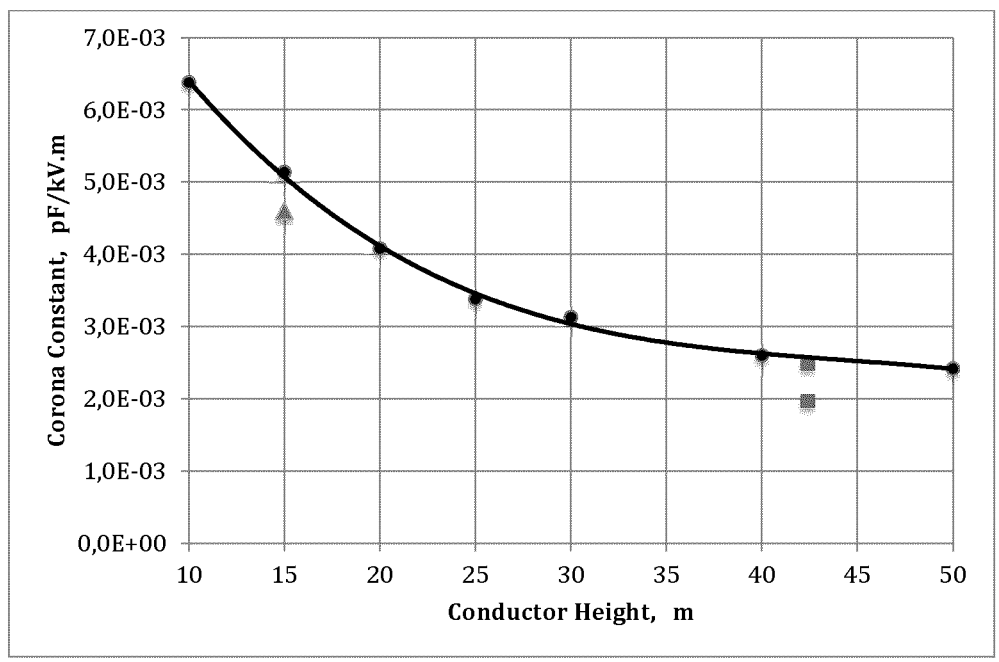
FIG. 11 is graphic showing the variation of negative impulse corona constant k with conductor height above ground. Triangle: deduced from [16], Square: deduced from [17]. Conductor diameter: 1.5 cm.
Figure 12:
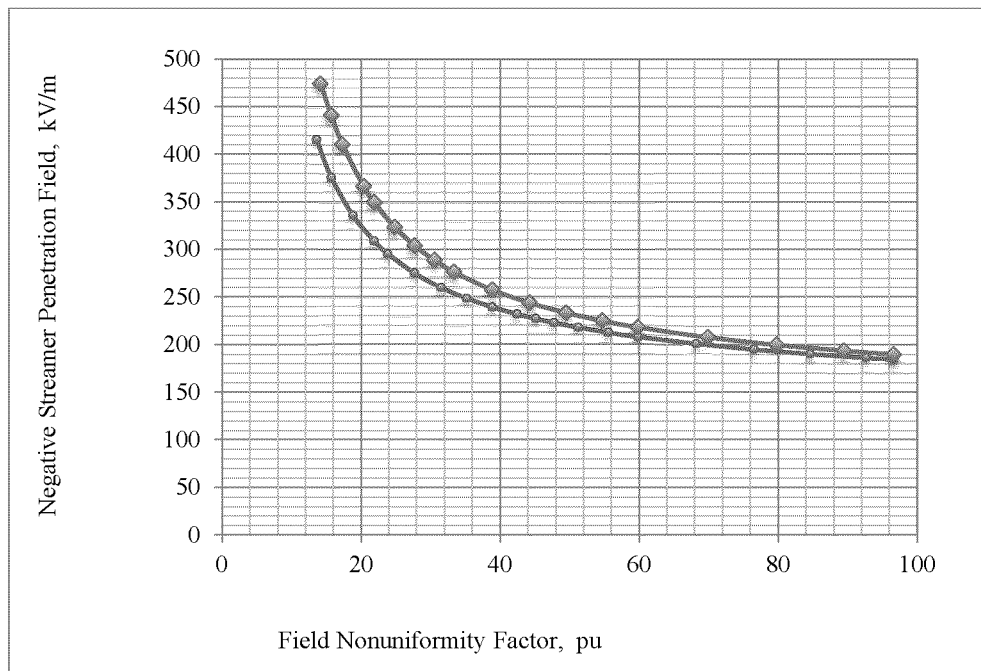
FIG. 12 is a graphic showing the variation of critical negative streamer penetration field with field nonuniformity, conductor-plane gap. Conductor radius, Upper: 0.5 cm, Lower: 0.75 cm
Figure 13:
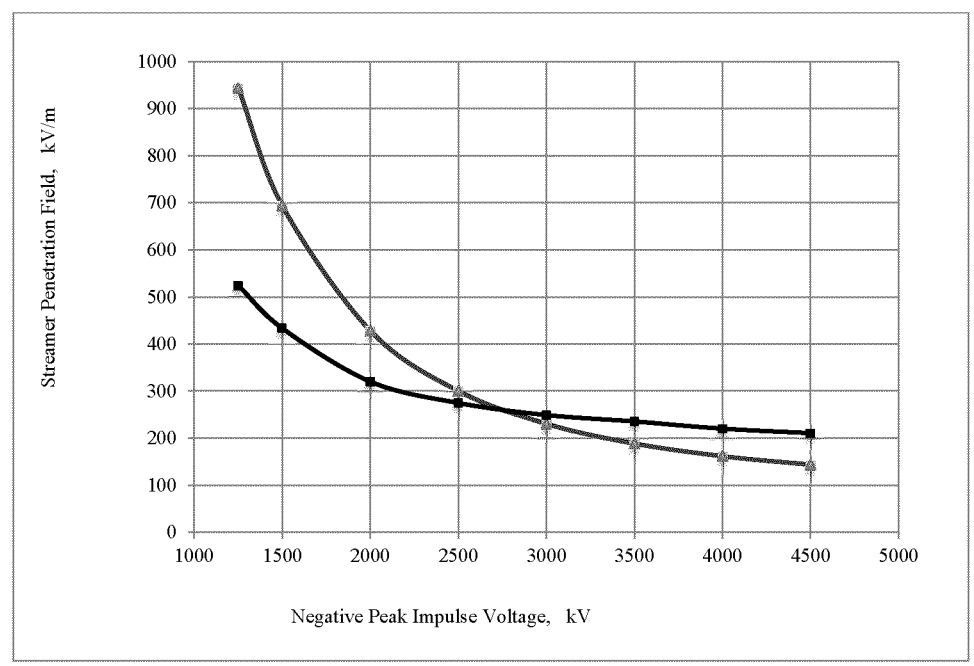
FIG. 13 is a graphic showing the variation of the critical negative streamer penetration field with peak impulse voltage in a conductor plane gap. $H_{gw}$: 30 m, Diameter: 1.5 cm. Triangular points: [4], at a corona constant of 0.0033 pF/kV·m. Square points: [3].
Figure 14:
FIG. 14 is a graphic showing the variation of critical positive switching impulse withstand voltage with gap length of a phase conductor-embedded ground wire gap. Conductor diameter: 3 cm, Embedded conductor: 1.5 cm. Conductor heights: 20 m.
Figure 15:
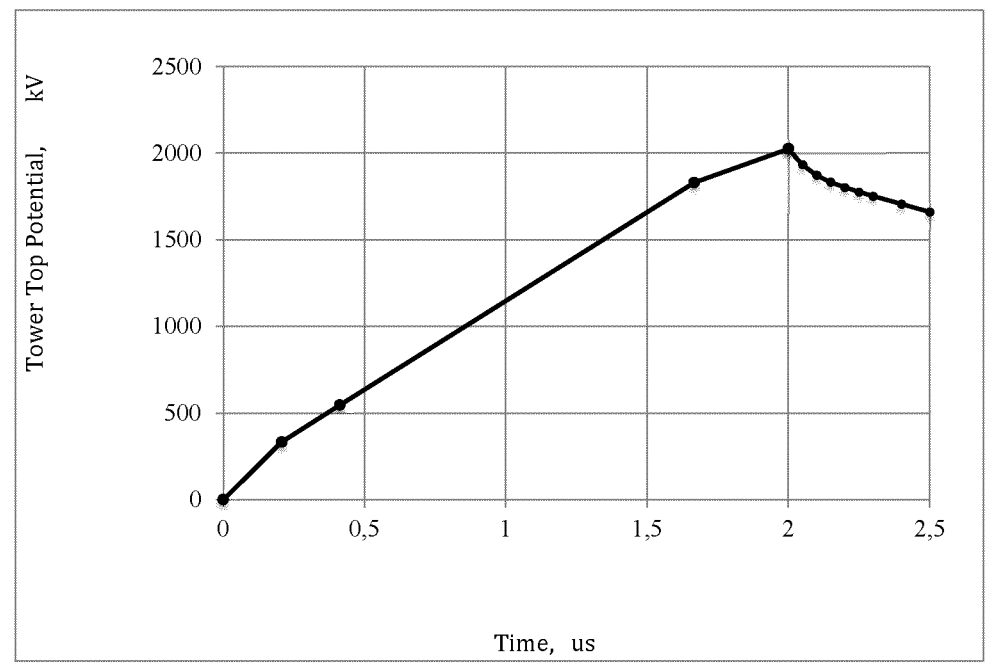
FIG. 15 is a graphic showing the tower top impulse potential at critical backflash current, 245 kV SC SGW. No embedded ground conductor. $H_t$:31 m, Span: 250 m, $R_i$: 77 ohm, $R_0$:80 ohm, $I_{stroke}$: 37.65 kA
Figure 16:
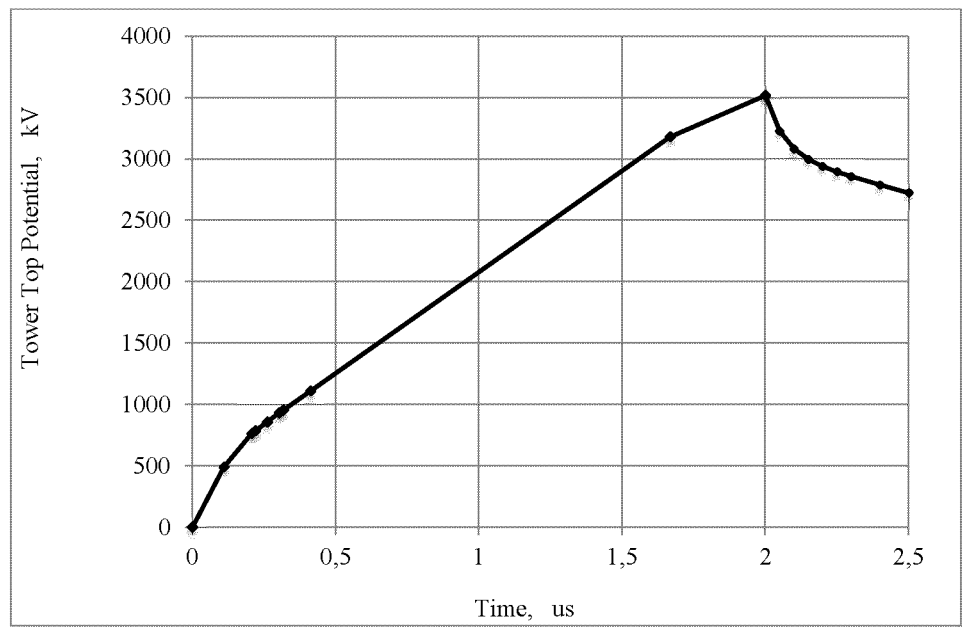
FIG. 16 is a graphic showing the variation of tower top potential with time, at critical current backflash level. 245 kV SC SGW, with embedded ground conductor. $H_t$: 31 m, Span: 250 m, $H_{emb}$: 14.44 m. $R_i$: 51 ohm, $R_0$: 80 ohm, $I_{stroke}$: 100.5 kA.
Figure 17:
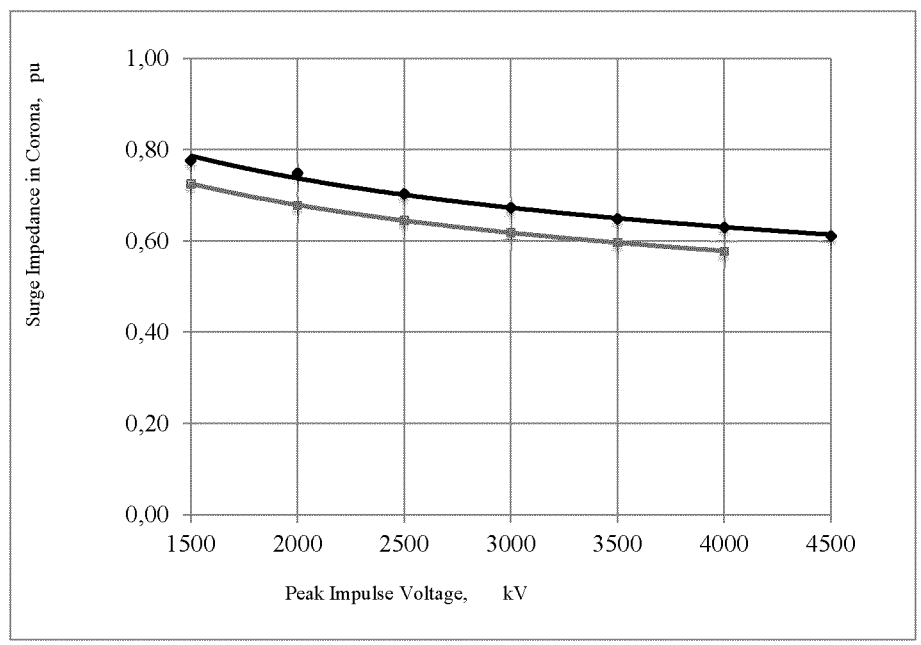
FIG. 17 is a graphic showing the variation of surge impedance in corona, in per unit of the geometric value, with peak impulse voltage. Upper: Ground Wire, h=30 m, $r_0$=0.75 cm. Lower: Embedded Conductor, h=20 m, $r_0$=0.75 cm.
Figure 18:
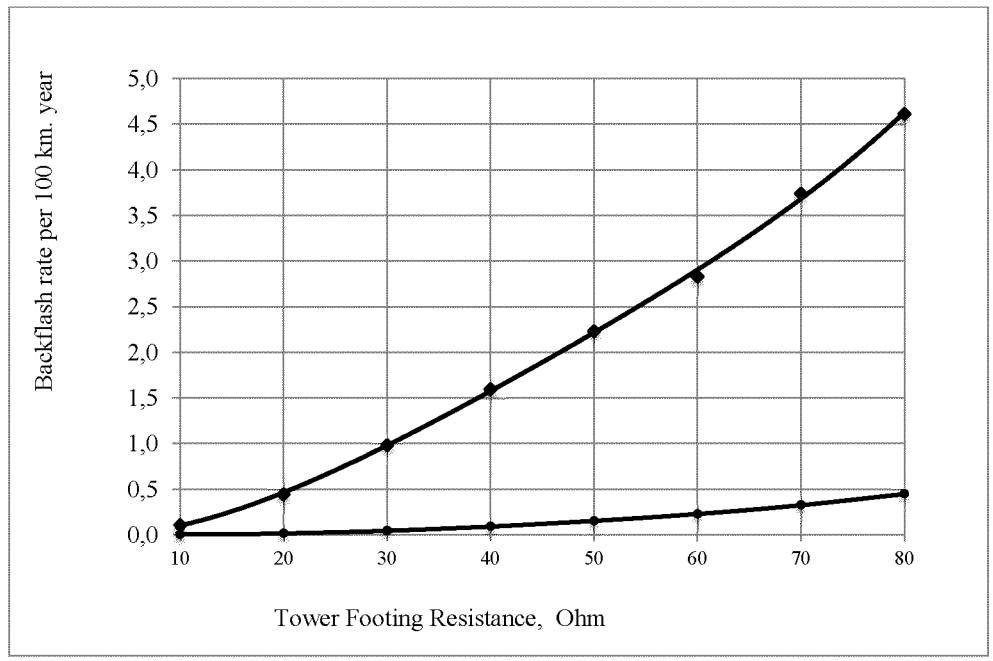
FIG. 18 is a graphic showing the variation of backflash rate with tower footing resistance. 245 kV SC, SGW, with (Lower) and without (Upper) embedded ground wire. $H_{gwt}$: 31 m, Span: 250 m, $H_{embi}$:15.44-15.74 m. Lower phase attachment height: 14.44 m. $N_g$:1/sq·km·year
Figure 19:
FIG. 19 is a graphic showing the variation of backflash rate with tower footing resistance. 345 kV DC DGW, $H_t$:31.9 m, Span 300 m, with (Lower) and without (Upper) embedded GW. $H_{emb}$=13.35 m. Lower phase attachment height: 13.35 m, $N_g$=1/sq·km·year
Figure 20:
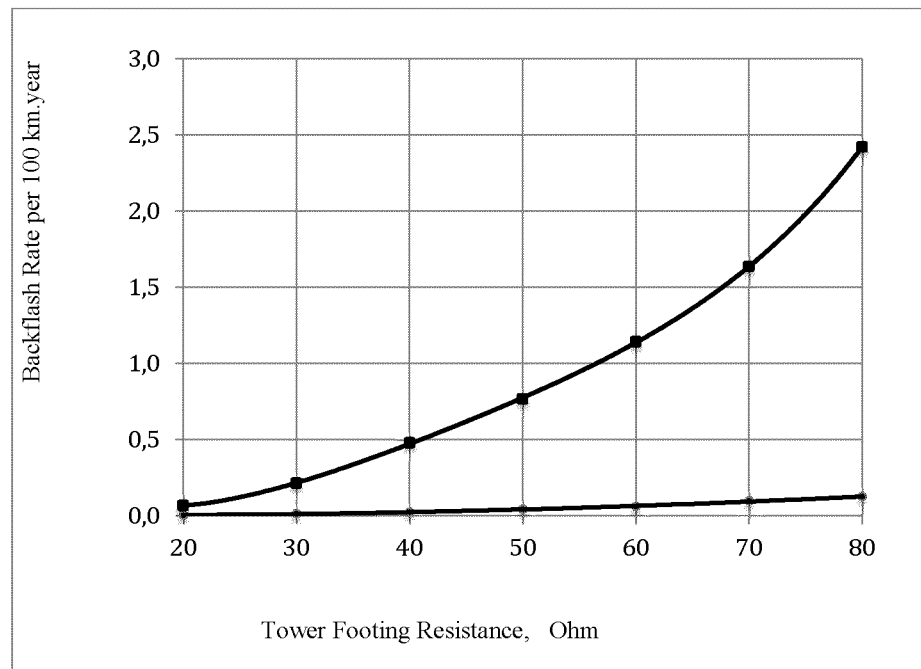
FIG. 20 is a graphic that shows the variation of backflash rate with tower footing resistance. 420 kV DC DGW, with (lower) and without (upper) embedded ground wire. $H_{gwt}$: 50 m, Span: 300 m, Lower phase attachment height: 17 m, $H_{emb}$: 18-21 m. $N_g$: 1 F/sq·km·year
Figure 21:
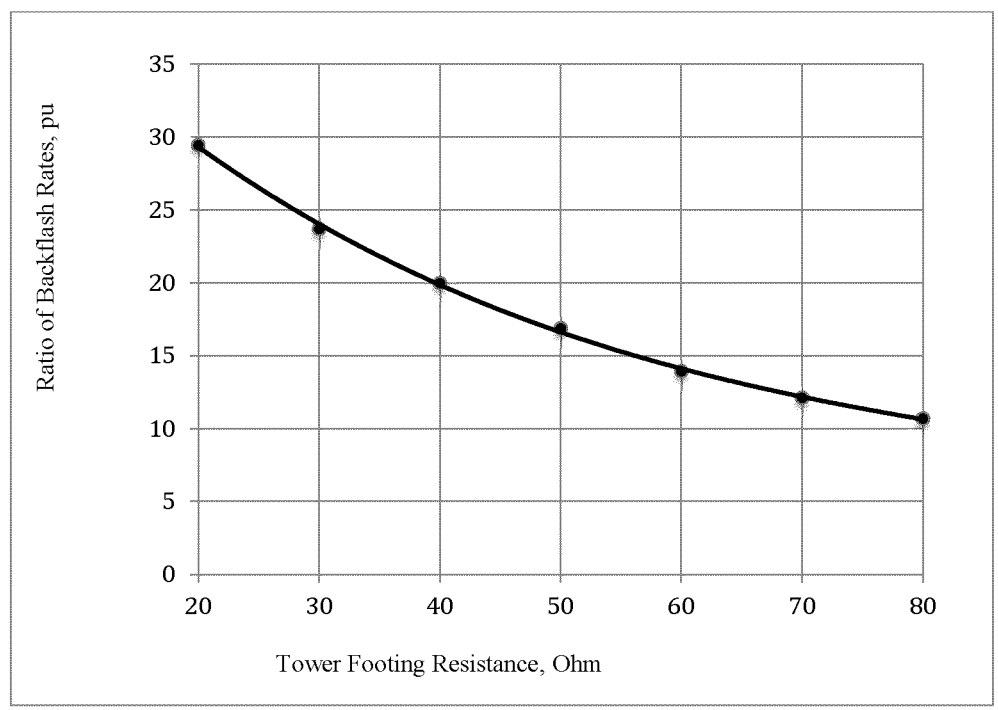
FIG. 21 is a graphic showing the dependence of the ratio $N_s$ to $N_{sw}$, respectively backflash rates without and with embedded GW, on tower footing resistance. 245 kV SC SGW, tall tower and long span. $H_{gwt}$: 43.5 m, Span: 370 m. $H_{1t}$: 36.9 m, $H_{2t}$=$H_{3t}$: 29.35 m. $H_{emb}$: Variable in the range 29.35 m to 31 m.

8. Comparison of the back flashover performance of transmission lines with embedded inhibited conductors to lines not provided with such a feature, shows reduction of the back flashover rate by a factor of 10 or more. The largest absolute reduction in backflash rate occurs where such an improvement is most needed, as shown by typical simulation results in FIG. 2, FIG. 3 and FIG. 4. The simulation result shows the variation of the backflash rate with footing resistance of the struck tower with an embedded conductor (lower curve) and without an embedded conductor (upper curve) for 3 different system voltages.

The scope of the claims should not be limited by the preferred embodiments set forth in the examples but should be given the broadest interpretation consistent with the description as a whole. The present description refers to a number of documents, the content of which is herein incorporated by reference in their entirety.

REFERENCES

1. F. A. M. Rizk, "Modeling of transmission line exposure to direct lightning strikes", IEEE Transactions on Power Delivery, Vol. 5, Issue 4, November 1990, pp. 1983-1997.
2. F. A. M. Rizk, "Modeling of proximity effect on positive leader inception and breakdown of long air gaps", IEEE Transactions on Power Delivery, Vol. 24, Issue4, April 2011, pp. 2311-2318.
3. F. A. M. Rizk, "Modeling of UHV and double circuit EHV transmission line exposure to direct lightning strikes", IEEE Transactions on Power Deliver, Vol. 32, Issue4, August 2017, pp. 1739-1747.
4. F. A. M. Rizk, "A simplified approach for assessment of exposure of EHV and UHV lines to direct lightning strikes", IEEE Transactions on Power Delivery, Vol. 33, Issue 5, October 2018, pp. 2420-2427.
5. A. R. Hileman, Insulation Coordination for Power Systems, Book, Marcel Dekker Inc., New York, 1999, Chapter 10, The Backflash, p. 402.
6. S. Visacro, F. H. Silveira and A. De Conti, "The use of Underbuilt Wires to Improve the Lightning Performance of Transmission Lines", IEEE Transactions on Power Delivery, Vol. 27, No. 1, January 2012, pp. 205-2013.
7. F. A. M. Rizk, "New Approach for Assessment of Positive Streamer Penetration of Long Air gaps under Impulse Voltages", IEEE Transactions on Dielectrics and Electrical Insulation, Vol. 27, issue 3, June 2020, pp. 791-798.
8. L. I. Sirotinski, "Hochspannungstechnik", Book, Vol. 1, Part 1, Chapter 5, 1955, p. 132.
9. Les Renardieres Group, "Negative Discharges in Long Air Gaps at Les Renardieres", Electra, No. 74, January 1981, p. 112.
10. C. Gary, G. Dragan, D. Critescu, "Attenuation of Travelling Waves Caused by Corona", CIGRE, Paper 33-13, 1978.
11. J. G. Anderson, "Lightning Performance of Transmission Lines", Book, Chapter 12, Transmission Line Reference Book, 345 kV and Above, Second Edition, 1987, pp. 545-597.
12. CIGRE WG 33.01, "Guide to Procedures for Estimating The Lightning Performance of Transmission Lines", TB 63, October 1991.
13. IEC Standard 60-1, "High Voltage Test Techniques", Part 1: "General definitions and test requirements", 1989.
14. IEC Standard 71-2 "Insulation Coordination-Part2: Application Guide", 1996, p. 175.
15. P. S. Maruvada "Corona in Transmission Systems", Book, Eskom, South Africa, 2011.
16. C. Gary, D. Cristecu and D. Dragan, "Distortion and Attenuation of Travelling Waves caused by Transient Corona", CIGRE TB 55, 1989.
17. T. Noda, T. Ono, H. Matsubara, H. Motoyama, S. Sekioka, A. Ametani "Charge-Voltage Curves for Surge Corona on Transmission Lines: Two Measurement Methods", IEEE Transactions on Power Delivery, Vol. 18, No. 1, January 2003, pp. 307-314.
18. F. A. M. Rizk, "Negative Impulse Ground Wire Corona Parameters for Backflash Evaluation of High Voltage Transmission Lines", Accepted for publication, IEEE Transactions on Power Delivery, 2021.
19. M. Darveniza, F. Popolansky, E. R. Whitehead, "Lightning Protection of UHV Transmission Lines", Elektra 41, 1975, pp. 39-69.
20. IEEE Guide for Improving Lightning Performance of Transmission Lines, IEEE Std. 1243-1997.
21. C. Gary, G. Dragan and D. Critescu, "Attenuation of Travelling Waves Caused by Corona", CIGRE, 1978, Paper: 33-11.
22. A. V. Korsuntcev, "Application of the theory of similitude to the calculation of concentrated ground electrodes", Elektrichestvo, No. 5, May 1958, pp. 31-35.
23. F. A. M. Rizk, "Switching Impulse Strength of Air Insulation: Leader Inception Criterion", IEEE Transactions on Power Delivery, Vol. 4, No. 4, October 1989, pp. 2187-2195.
24. C. A. E. Uhlig, "The ultra corona discharge, a new phenomenon occurring on thin wires", High Voltage Symposium, NRC, Ottawa, Canada, 1956.
25. F. A. M. Rizk, "Analysis of space charge generating devices for lightning protection: performance in slow varying fields", IEEE Transactions on Power Delivery, Vol. 25, No. 3, July 2010, pp. 1996-2006.
26. F. A. M. Rizk, "Exposure of Overhead Conductors to Direct Lightning Strikes: Modeling of Positive Streamer Inhibition", IEEE Transactions on Power Delivery, Vol. 26, Issue 2, April 2011, pp. 1156-1165.
27. A. J. Eriksson, "The Incidence of Lightning Strikes to Power Lines", Vol. 2, No. 3, July 1987, pp. 859-870.

The invention claimed is:

1. A system comprising at least two adjacent power transmission tower structures including lower power conductors and upper power conductors, the system comprising at least one existing overhead ground wire and an embedded ground wire or wires, wherein the embedded ground wire is connected between the two adjacent power transmission tower structures at or in a vicinity of a vertical axis of each of the power transmission tower structures in a position at or above attachment points of the lower power conductors and below the upper conductors, wherein the position of the embedded ground wire or wires optimizes coupling factors to all said power conductors for improved back flashover lightning performance.

2. The system according to claim 1, wherein the embedded ground wire is a streamer inhibited conductor.

3. The system according to claim 1, wherein the embedded ground wire is a bundle of conductors.

4. The system according to claim 1, wherein the embedded ground wire is a communication cable.

5. A power transmission tower structure including power conductors, the structure comprising at least one existing overhead ground wire and an embedded ground wire or wires, wherein a position of the embedded ground wire or wires optimizes coupling factors to all said power conductors for improved back flashover lightning performance, and wherein the embedded ground wire is isolated from the tower under system voltage and grounded under lightning impulse voltages.

6. The power transmission tower structure according to claim 5, wherein the embedded ground wire is mounted on a low voltage distribution insulator.

7. Method for determining a location of installation of at least one embedded ground wire on a power transmission tower structure including at least one existing ground wire and power conductors for improved lightning performance thereof, said method comprising:

a1) without said embedded ground wire being installed on said power transmission tower structure, calculating a peak impulse voltage $U_{insn}$ impressed across an insulator string n using the following formula:

$$U_{insn} = U_{tn} - U_{gw} * \frac{Z_{mgwn}}{Z_{gw}} - U_{pfn} \qquad (12)$$

$U_{tn}$: is a transient voltage at a relevant point on the power transmission tower structure, $U_{gw}$: is a transient voltage on the existing ground wire, comprising a ground and a tower component, $Z_{gw}$: is a surge impedance of the existing ground wire in corona, $Z_{mgwn}$: is a mutual surge impedance between the existing ground wire and a phase conductor n, $U_{pfn}$: is a time varying power frequency voltage of phase n;

a2) determining an effect of corona on any ground wire by calculating a radial distance bridged by negative streamers for any applied peak impulse voltage;

a3) determining soil ionization effects on a tower footing resistance of said power transmission tower structure;

a4) performing transient voltage simulation to determine an effect of said steps a2) and a3) on said peak impulse voltage $U_{insn}$;

b) installing said embedded ground wire on said power transmission tower structure, said embedded ground wire being placed at an initial height $H_0$, and repeating said steps a1), a2), a3), a4) to determine an improved critical current by using the following equation:

$$U_{insn} = U_{tn} - U_{gw} * \frac{Z_{mgwn}}{Z_{gwe}} - U_a * \frac{Z_{man}}{Z_a} - U_{pf} \qquad (13)$$

wherein:

$Z_{gwe}$: is a surge impedance of the existing ground wire in corona, modified due to mutual coupling to said embedded ground wire, $U_a$: is a transient potential of said embedded ground wire, $Z_{man}$: is a mutual surge impedance between said embedded ground wire and phase conductor n, $Z_a$: is a surge impedance of said embedded ground wire, which also includes mutual coupling to the existing ground wire as well as said corona effect;

c) vary a height of the embedded ground wire by an amount ΔH, and repeat said step b) in order to determine the critical current; and d) repeat said step c) until the critical current reaches a maximum value, whereby a corresponding embedded ground wire height is at an optimum position for an overall backflash performance of a power transmission line of said power transmission tower structure.

8. A power transmission tower structure including power conductors, the structure comprising at least one existing ground wire and an embedded ground wire or wires, wherein a position of the embedded ground wire or wires to optimize coupling factors to all said power conductors for improved lightning performance is determined according to the method of claim 7.

9. The power transmission tower structure according to claim 8, wherein the embedded ground wire is a streamer inhibited conductor.

10. The power transmission tower structure according to claim 8, wherein the embedded ground wire is a bundle of conductors.

11. The power transmission tower structure according to claim 9, wherein the embedded ground wire is a communication cable.

12. The power transmission tower structure according to claim 8, wherein the embedded ground wire is isolated from the tower under system voltage but grounded under lightning impulse voltages.

13. The power transmission tower structure according to claim 12, wherein the embedded ground wire is mounted on a low voltage distribution insulator.

* * * * *